United States Patent Office 3,022,084
Patented Feb. 20, 1962

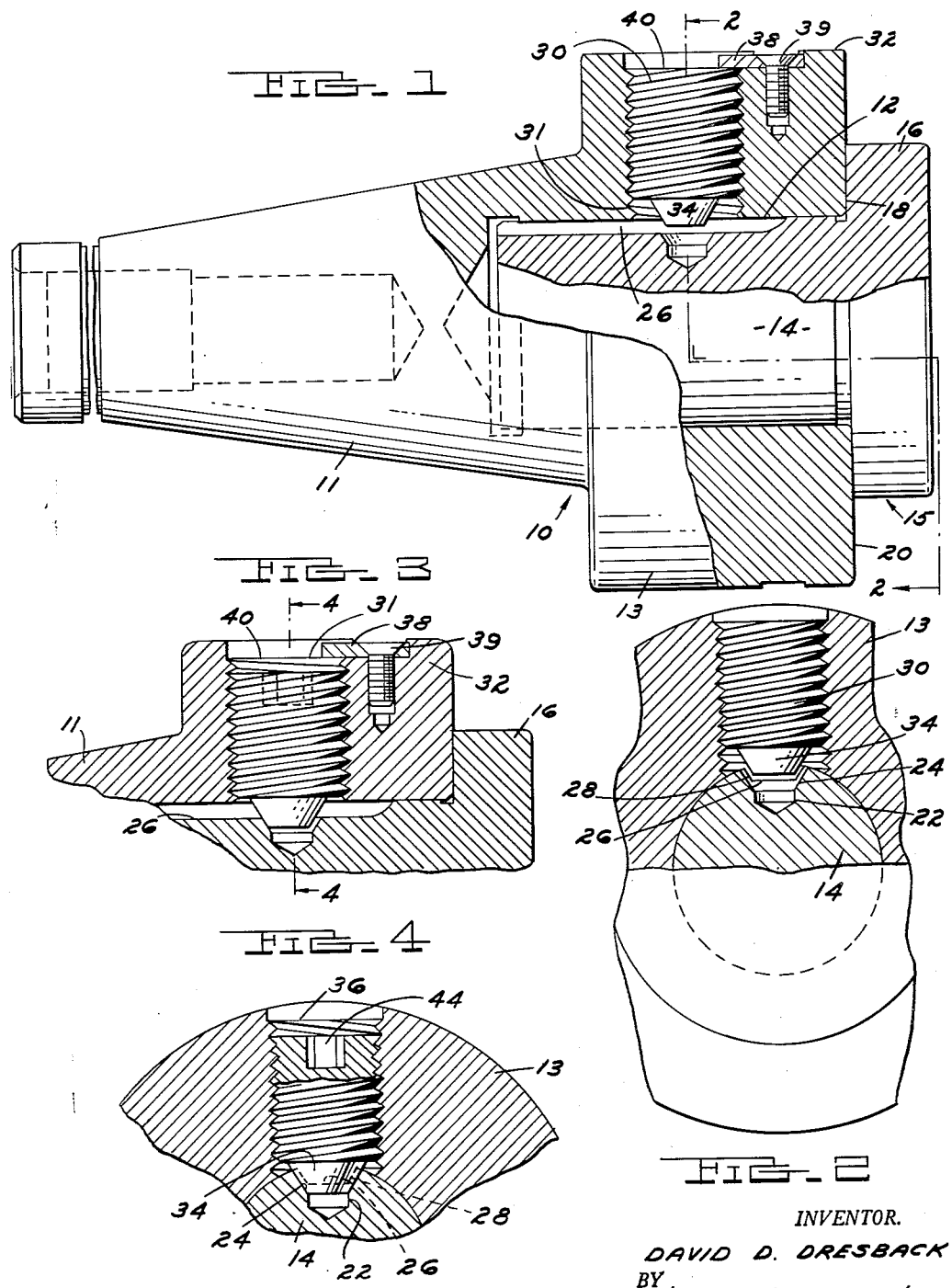

3,022,084
TOOL HOLDER AND TOOL SHANK CONSTRUCTION
David D. Dresback, Gaylord, Mich., assignor to Beaver Tool & Engineering Corporation, Gaylord, Mich., a corporation of Michigan
Filed Aug. 4, 1960, Ser. No. 46,634
7 Claims. (Cl. 279—83)

This invention relates to an improved construction for a tool holder and for the shank of the tool and provides means whereby the tool shank may be quickly located and locked in a tool holder.

The invention is particularly adapted for use in the construction of tool holders of the type having a cylindrical socket in which the tool shank is received, and correspondingly, for tool shanks having a cylindrical configuration, the term "tool" being used to denote either a cutting tool or an adapter member in which a cutting tool is mounted.

The overall or general object of the invention is to provide an extremely simple and effective construction for locating the shank of a tool in one position in a tool holder, and for locking the shank in this one position. The location of a tool in a tool holder can vary axially, thereby effecting the relative position between the cutting face and the gauge line of the machine in which the holder is mounted, angularly about the center of the socket in the tool holder, and of course radially with respect to this center. Locating in the present construction is such as to define one relative position between the tool shank and the holder both axially and angularly, so that the tool will assume this one position in the holder repeatedly each time it is inserted therein. Radial location is taken care of by a close fitting engagement between tool shank and holder socket.

The construction of the invention consists essentially in a tool holder having a cylindrical socket and a single locking plunger which is mounted in the tool holder body for movement at right angles to the axis of the socket and having a conical projection or detent on the inner end thereof. The tool shank is provided with a recess engageable by the projection on the plunger of the tool holder and a keyway leads along the shank to this recess, which is deeper than the keyway. The holder is provided with means for limiting the retracting or disengaging movement of the plunger so that when fully retracted, the plunger detent is withdrawn from the recess in the tool shank but is not withdrawn from engagement with the keyway. Thus the detent of the tool holder plunger, in the retracted position thereof, serves as a key for engaging the keyway of the tool shank, locating the shank angularly; and, when in extended or locking position, engages the recess in the shank. A flange is provided on the tool between the main and shank portions thereof, forming an abutment surface which is engageable with an abutment surface on the end face of the tool holder. The construction of the detent, plunger and recess is such that when the detent is brought into engagement with the recess the tool shank is drawn axially into the tool holder until the abutment surfaces of the holder and the tool are brought into engagement, thereby locating the tool axially relative to the holder.

A representative constructional example of the invention is disclosed in the accompanying drawings which consist of the following views:

FIGURE 1, a side elevation, partly in section of a tool holder showing a tool mounted therein;

FIGURE 2, a transverse sectional elevation taken as indicated by the line 2—2 of FIG. 1;

FIGURE 3, an elevation similar to FIG. 1, but with the locking plunger of the tool holder in extended or locked position;

FIGURE 4, a transverse sectional elevation taken as indicated by the line 4—4 of FIG. 3.

Referring to FIGURE 1, a tool holder body 10 is provided with a suitable shank portion 11 for mounting on the spindle of a machine. A cylindrical socket 12 is provided in the cylindrical portion 13 of the tool holder body for receiving the shank 14 of a tool 15. The main portion of this tool is only shown fragmentarily, it being understood that the main portion would include either a tool as an integral part thereof, or some means for mounting a tool thereon. In either case, the tool is provided with a flange 16 at the inner end of the main portion thereof, forming an abutment surface 18 which is ground perpendicular to the axis of the cylindrical shank portion 14. The end face 20 of the tool holder body is also ground perpendicular to the axis of the socket 12.

A recess 22 is formed in the surface of the tool shank, this recess having a truncated conical portion 24 formed on an axis perpendicular to the axis of the shank 14 of the tool. A keyway 26 is also formed along the surface of the shank portion 14, leading from the end of the shank through the recess 22 and having side walls 28 which are tapered on an angle corresponding to the taper of the conical portion 24 of the recess (see FIG. 2). The depth of the recess portion 24 exceeds the depth of the keyway.

A threaded plunger 30 is mounted in a threaded hole 31 in the tool holder body portion 13, the hole being formed on an axis perpendicular to the axis of the tool holder socket 12 and extending through the body from the outer circumference 32 thereof to the socket 12. Preferably this plunger 30 is formed in accordance with the teachings of the co-pending application of Raymond F. Nixon, Serial No. 769,427 and entitled "Quick Change Tool Holder," now abandoned, thereby providing a simple plunger construction which can be rapidly moved between locked and released positions. A truncated conical locking projection or detent 34 is provided at the inner end of the plunger 30, this detent being formed on an axis concentric with the axis of the threaded portion of the plunger and dimensioned for engagement in the portion 24 of the recess of the tool shank. A notch 36 is formed in the tool holder body at the outer end of the threaded bore 31 for the plunger 30, and a keeper member 38 is mounted in this notch by a screw 39. After the plunger has been installed, keeper member 38 is assembled to the tool holder body and extends into overlapping relation with the outer end 40 of the plunger thereby defining a limit of outward movement of the plunger, or in other words, the released position thereof. Dimensioning of the parts is such that the keeper member 38 defines a released position of the plunger in which the detent 34 thereof is not withdrawn from the tool holder socket 12 but projects into the socket an extent sufficient for engagement with the keyway 26 in the tool shank. Thus in released position, the detent 34 of the plunger acts as a key which defines at least the general angular position in which the tool shank can be inserted into the holder.

A wrench socket 44 is provided in the outer end of the plunger 30. With the plunger in retracted or released position as shown in FIGS. 1 and 2, a tool is inserted in the holder by placing the tool shank keyway 26 into engagement with the plunger detent 34 and then moving the tool into the tool holder socket. For increased ease of insertion, a greater clearance can be provided between the detent 34 and keyway sidewalls 28 than is normal in key and keyway constructions because the keyway 26 merely serves to lead the detent 34 to the recess 24. Precise angular location of the shank will always result when the plunger 30 is rotated by a wrench to engage the tapered detent 34 in the tapered portion 24 of the recess in the tool shank.

The ground faces 18 and 20 of the tool element and holder respectively, serve as reference surfaces and the axis of the tool recess 24 is located at a slightly lesser distance from the tool reference surface 18 than the distance between the tool holder reference surface 20 and the axis of the threaded plunger bore 31. As a result, engagement between the detent 34 of the plunger and the recess 24 always takes place in the manner shown in FIG. 3, the plunger engaging the portion of the recess which is axially at the greatest distance from the tool reference surface 18, and due to the tapered form of both the detent 34 and recess 24, this engagement tends to produce an axial inward movement of the tool relative to the tool holder socket and bring the two reference surfaces 18 and 20 into abutment. Positive axial location of the tool element in the tool holder is thereby repeatedly assured.

The simplicity and advantages of the invention are believed evident from the presently preferred construction described above in detail. It will be understood that numerous modifications of this construction might be resorted to without departing from the scope of the invention as defined in the following claims.

I claim:

1. In a tool holder having a body with a socket formed therein, means for locating and locking a tool shank in said socket in driving relation with said holder comprising a plunger, thread means mounting said plunger in said body for locking and releasing movement toward and away from the axis of said socket, a detent rigidly projecting from the inner end of said plunger, means limiting the extent of releasing plunger movement to define a released position of said plunger in which at least a portion of said detent extends into said socket, a recess formed in said tool shank for engagement by said detent and a keyway leading axially along said shank to said recess, said keyway having a depth less than said recess and being engageable by said plunger detent in the said released position thereof.

2. In the combination of a tool holder having a body with a cylindrical socket formed therein for receiving the cylindrical shank of a tool element, means for locating and locking said shank in said socket in driving relation with said holder comprising a plunger having a shank engaging end, thread means mounting said plunger in said body for locking and releasing movement toward and away from said socket, means limiting the extent of said releasing movement to define a released position of said plunger in which the said shank engaging end thereof is located within the circumference of said socket, a recess formed in said shank for engagement by the said end of said plunger, and locating surface means extending axially along said shank from the end thereof to said recess thereon, said locating surface means being positioned within the circumference of said shank and at a distance from the center thereof greater than the bottom of said recess, said locating surface means being engageable by said plunger end portion in the released position thereof to guide said shank into said holder to a position where said shank recess is engageable by said plunger end portion upon locking movement thereof.

3. In a combination as set forth in claim 2, said shank locating and locking means being further characterized by said tool element recess being provided with a conical portion, said shank engaging end of said plunger having a complementary conical portion, and said locating surface means comprising a keyway axially aligned with said recess and having side walls formed on the taper of said conical portions.

4. In a combination according to claim 2, said means limiting the extent of releasing plunger movement comprising a keeper member secured to said tool holder body in overlying relation with the outer end of said plunger, said keeper member further serving to normally prevent removal of said plunger from said tool holder body.

5. A tool element for use with a tool holder having a socket and a locking member therein, said tool element including a cylindrical shank portion, a recess formed in the surface thereof for engagement by said locking member, and locating surface means leading along said shank from the end thereof to said recess and axially aligned therewith.

6. A tool element according to claim 5 wherein said locating surface extends through said recess, said tool element being provided with a radially extending surface located between the said shank portion and the remaining portion thereof, said recess being formed in defined relation to said radially extending surface.

7. A tool element according to claim 5 further characterized by said recess including a conical portion, and said locating surface being formed at least in part by a keyway on said shank, said keyway having side walls formed on a taper corresponding to that of said recess conical portion.

References Cited in the file of this patent

UNITED STATES PATENTS

| | | |
|---|---|---|
| 2,039,855 | Stone | May 5, 1936 |
| 2,167,014 | Verderber | July 25, 1939 |
| 2,362,053 | Danielson | Nov. 7, 1944 |